United States Patent [19]
Gillespie et al.

[11] Patent Number: 5,881,809
[45] Date of Patent: Mar. 16, 1999

[54] WELL CASING ASSEMBLY WITH EROSION PROTECTION FOR INNER SCREEN

[75] Inventors: George A. Gillespie, Coon Rapids; Stephen A. Uban, Stillwater, both of Minn.

[73] Assignee: United States Filter Corporation

[21] Appl. No.: 926,308

[22] Filed: Sep. 5, 1997

[51] Int. Cl.⁶ .................................................. E21B 43/08
[52] U.S. Cl. ........................................... 166/233; 166/236
[58] Field of Search .................................. 166/233, 236, 166/278, 228

[56] References Cited

U.S. PATENT DOCUMENTS

| | | | |
|---|---|---|---|
| 635,290 | 10/1899 | Black . | |
| 1,211,415 | 1/1917 | Cross . | |
| 1,604,386 | 10/1926 | Byerly . | |
| 2,429,043 | 10/1947 | Barnhart | 166/236 |
| 3,369,665 | 2/1968 | Paulson | 210/94 |
| 4,064,938 | 12/1977 | Fast | 166/236 |
| 4,067,812 | 1/1978 | Drori | 210/310 |
| 4,440,218 | 4/1984 | Farley | 166/51 |
| 4,476,925 | 10/1984 | Cox | 166/236 X |
| 4,858,691 | 8/1989 | Ilfrey et al. | 166/278 |
| 5,150,753 | 9/1992 | Gaidry et al. | 166/278 |
| 5,551,513 | 9/1996 | Surles et al. | 166/278 |
| 5,624,560 | 4/1997 | Voll et al. | 210/486 |

*Primary Examiner*—Frank Tsay
*Attorney, Agent, or Firm*—Barry L. Clark

[57] ABSTRACT

Well casing assembly for use in oil and gas wells, and especially deviated or horizontal wells, has an inner pipe member with threaded ends which permit a number of casing assemblies to be joined in a string. The inner pipe has a series of perforations along a segment of its length which are covered by an elongated screen member which prevents the passage of sand particles. A concentric outer protective cover member is devoid of perforations in regions which are radially opposite the inner screen to prevent damage to the screen. One or more perforated segments of the outer member are axially spaced from the screen member so that inward flow from a formation will have its energy and velocity reduced before it reaches the screen, thereby minimizing erosion of the screen surface. If desired, perforated flow control devices such as annular rings can be located between the inner pipe and outer member at the ends of the screen segment to allow a more uniform flow to the screen, and thus further reduce erosion.

14 Claims, 2 Drawing Sheets

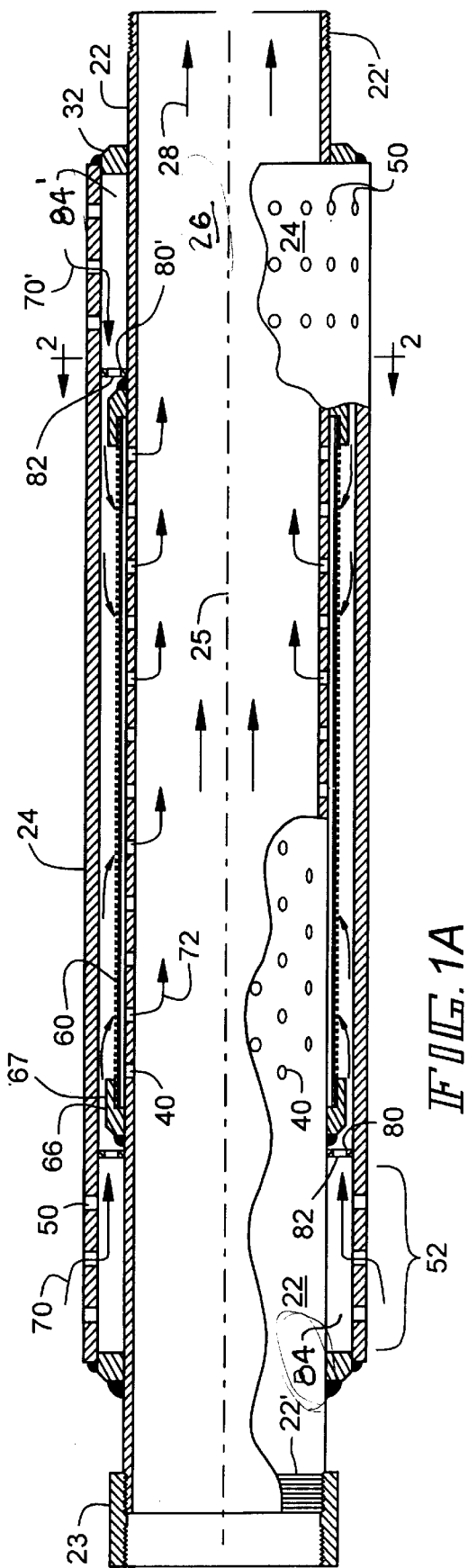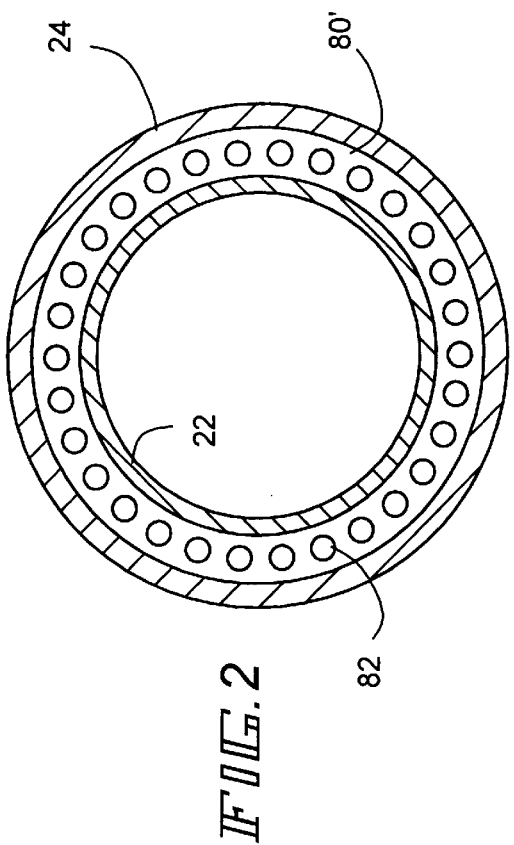

WELL CASING ASSEMBLY WITH EROSION PROTECTION FOR INNER SCREEN

BACKGROUND

1. Field of Invention

This invention pertains to well casings of the type that are utilized in subterranean drilling for and pumping of natural resources such as oil and gas.

2. Related Art and Other Considerations

The world remains greatly dependent upon subterranean natural resources such as oil and gas for energy production. To this end, improved methods and apparatus are continually sought for extracting fluids such as oil and gas from underground formations.

A typical oil or gas well includes an elongated pipe string made up of a plurality of casing assemblies, each of which has both a cylindrical inner pipe and a concentric outer member. Both the outer member and the inner pipe are perforated. The perforations in the outer member allow inflow from a formation into an annular region between the outer member and the inner pipe. The inner pipe has a screen covering its perforations so that particulate matter entrained in the fluid will be removed from the fluid before the fluid flows from the annular region into the inner pipe and is directed axially through the inner pipe to the surface for fluid recovery.

The perforations on the outer member are normally of a sufficiently large size, such as 0.25", so as to not retain sand from the formation. Perforations of such a size would usually protect an internal screen member located beneath the perforations from being damaged. However, in some formations, sharp projections, such as in pockets of shale, can cause damage to an underlying screen if they should penetrate the perforations on the outer member and deform a portion of the screen surface, causing an enlarged opening therein. This is particularly true when the well is deviated at an angle to the vertical, or horizontal, causing the outer member to bear on the formation wall with a considerable force as it is run into the well bore. Moreover, in situations of high fluid flow, the fluid entering through the perforations of the outer member can impinge on certain areas of the screen with sufficient velocity and force so as to damage the screen. For a screen formed by rods and wires, for example, too great a force of the incoming particulate containing fluid applied to a small area of the screen can cause enlargement of the slot openings formed by the wires. Such enlargement would not only reduce the effectiveness of the screen but would cause a reduced pressure drop in the area, and thus cause even more particulate containing flow to impinge on the wires so as to produce further widening and thereby render the screen useless for its intended purpose.

In order to reduce the energy of fluid forces applied to screens in well casing assemblies, it has been proposed to have the outer member provided with slots or openings which are shaped so as to cause the fluid flowing radially through the openings to move a short distance axially before it again flows radially inwardly through a screen member. In this regard, see U.S. Pat. No. 5,624,560 to Voll et al. However, the structure shown in this patent does not address the problem of screens being damaged when protrusions of subterranean formations enter the perforations and deform the underlying screen surface. While it has been known in the prior art to form inlet and outlet perforations at offset locations with respect to concentric pipes, as disclosed in U.S. Pat. No. 1,604,386 to Byerly, perforation placement has not been taught or suggested for protection of screens located inside casing assemblies.

What is needed, therefore, and an object of the present invention, is apparatus for protecting well screens from damage otherwise occasioned by protrusion and/or fluid force. Another object is to provide improved flow distribution in high flow sections of the formation so as to reduce erosion of the well screens.

SUMMARY

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is cross-sectional side view of a well casing according to a second embodiment of the invention which utilizes flow control devices in the form of flow control rings between an inner pipe and an outer member.

FIG. 2 is a cross-sectional view of the well casing of FIG. 1A taken along line 2—2.

DETAILED DESCRIPTION OF THE DRAWINGS

Figure 1:
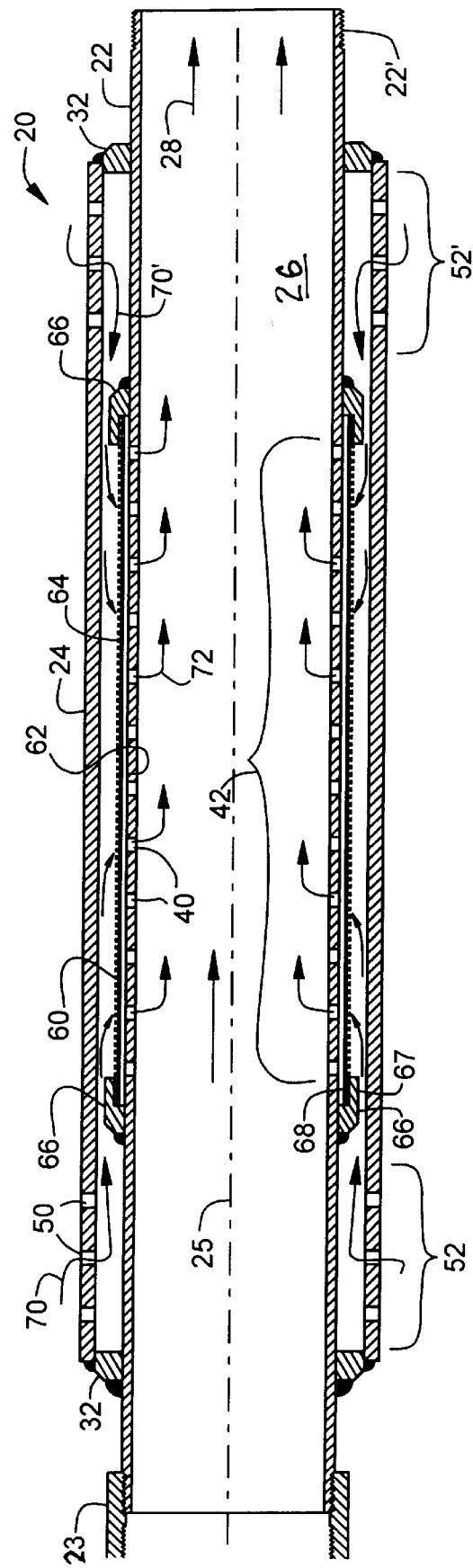
FIG. 1 is cross-sectional side view of a well casing according to a first embodiment of the invention.

In the following description, for purposes of explanation and not limitation, specific details are set forth such as particular architectures, techniques, etc. in order to provide a thorough understanding of the present invention. However, it will be apparent to those skilled in the art that the present invention may be practiced in other embodiments that depart from these specific details. In other instances, detailed descriptions of well known devices and methods are omitted so as not to obscure the description of the present invention with unnecessary detail.

FIG. 1 shows well casing assembly 20 according to an embodiment of the present invention. Well casing assembly 20 includes both an essentially cylindrical inner pipe 22 and a concentric outer protective cover member 24 which is illustrated as being a pipe, but which may have other configurations which will serve to protect an underlying screen member as the casing assembly is run into a bore hole. Both inner pipe 22 and outer member 24 extend parallel to casing axis 25. In its interior, inner pipe 22 provides a channel 26 through which fluid, such as oil or gas, may be directed in the direction shown by arrows 28. Typically, the length of a casing assembly 20 is 30–40 feet. The assemblies have threaded sections 22' on each end so that each assembly can be attached to another identical assembly by a coupling 23. In many situations, a string of joined casing assemblies might extend 2000 feet or more.

At its ends, outer member 24 is mounted, such as by welding, about inner pipe 22 by annular collar or cap members 32. It should be understood that other means of spacing and sealing the outer member 24 about inner pipe 22 can be employed. Inner pipe 22 has a first series of perforations 40 along its length to form a first length segment 42. Outer member 24 has a series of openings or perforations 50 provided in one or more segments of its length, preferably in a second length segment 52 positioned adjacent one of its ends and a third length segment 52' positioned adjacent its other end. However, other types of perforations are also contemplated, such as louvers. Length segments 52, 52' are parallel to casing axis 25, but extend along the casing axis 25 for only a fraction of the length of the well casing. In one embodiment, length segments 52, 52' each extend for approximately 9 feet, and have perforations 50 in the form of 0.25 inch holes located on 0.5 inch centers in both longitudinal and circumferential directions. In the example of FIG. 1, the density of perforations 50 is in a range from about 400 to 800 per foot of length.

As previously noted, inner pipe 22 has a series of perforations 40 formed through it along a first length segment 42. Like length segments 52, 52', length segment 42 is parallel to casing axis 25 and extends along the casing axis 25 for only a fraction of the length of the well casing. However, as shown in FIG. 1, length segment 42 is axially offset with respect to length segments 52, 52' along casing axis 25. In one embodiment, length segment 42 extends for approximately 18 feet, having perforations 40 which each have a diameter of 0.50 inches. In the example of FIG. 1, the density of perforations 40 is in a range from about 20 to 90 per foot of length.

Inner pipe 22 has a screen 60 concentrically mounted on it along length segment 42. Screen 60 is formed by a plurality of axially-extending rods 62 which are overlaid by a helically wound wire 64 welded to the rods at each intersection. Screen wires 64 are typically fabricated to have a "V" or wedge shaped profile so that the flow slot formed in the space between adjacent wraps of wire cannot be blinded by sand particles in the formation. Screen 60 is mounted at its opposite ends to the outer circumference of inner pipe 22 by attachment rings 66, at least one of which is attached to the inner pipe 22, such as by welding. The attachment rings 66 have an axially extending outer surface 67 which has a larger outer diameter than the outer diameter of the screen 60. The fact that the surface 67 has a larger outer diameter than the screen causes fluid flowing over it, which is flowing at a high velocity, to be diverted away from the screen surface, thereby reducing the possibility that the fluid will cause erosion of the screen surface. The extended length of the surface 67 also allows the ring 66 to include an annular recessed opening 68 which serves to contact and retain the ends of the screen 60.

As shown in FIG. 1, the series of perforations 50 in outer member 24 are offset axially from the series of perforations 40 in the inner pipe 22. Although the degree of offset can differ in various embodiments, as illustrated in FIG. 1, perforations 40 and 50 are sufficiently offset so that there is no overlap of perforations 40 and 50 along casing axis 25. In fact, the segments 52, 52' of outer member 24 in which perforations 50 are formed do not overlap axially with the segment 42 of inner pipe 22 in which perforations 40 are formed and over which screen 60 is mounted. Although a wire wrapped screen has been described, it is contemplated that other types of screening surfaces could also be used, such as sintered fibers, wire mesh or sintered particles.

Although the series of perforations 50 on outer member 24 could all be positioned at one end of the outer member while the perforated length segment 42 of the inner pipe 22 could be positioned at the opposite end of the outer member, we prefer the positioning shown in FIG. 1 since it provides a shorter flow path for the fluid entering the perforations and also because it provides more uniform access to the fluid in the formation. In addition, when the perforations 40 in the inner pipe 22 are in the middle of its length, the non-perforated, and thus stronger portions of the pipes, are at its ends where the pipe is subjected to its highest twisting or tensile forces.

As shown in FIG. 1, fluid from a formation enters the casing assembly 20 first in a generally radial direction through perforations 50. The fluid then travels axially along annular segments 52, 52' in the directions depicted by arrows 70, 70'. Upon reaching segment 42, the fluid passes generally radially inwardly through screen 60 as shown by arrows 72. Thereafter, the fluid flows through channel 26 in the axial direction depicted by arrows 28.

From the preceding description, one can see that the design of well casing assembly 20 of the present invention causes a change of direction of fluid flow, thereby lessening the force of the incoming fluid upon screen 60 while also greatly reducing its velocity as compared to its velocity as it enters perforations 50. Moreover, since perforations 50 are arranged in a staggered or offset relationship along casing axis 25 with screen 60, the screen 60 is not susceptible to damage by intrusion of subterranean features through perforations 50. Also, the strongest non-perforated portion of outer member 24 is located over segment 42 to further protect screen 60.

The embodiment of FIG. 1A differs from that of FIG. 1 by the provision of flow control devices in the form of flow control rings 80, 80'. The flow control rings 80, 80' are situated in the annular space between inner pipe 22 and outer member 24. As shown in FIG. 2, flow control rings 80, 80' have a plurality of apertures 82 formed therein. Apertures 82 permit flow of fluid parallel to casing axis 25. The inclusion of apertured flow control rings will produce a pressure drop which will tend to even out the flow reaching the screen 60 from uneven flow areas in the formation, thereby further protecting the screen from erosion.

A design criteria for the flow control rings 80, 80' which will provide uniform flow to the screen 60, and thus reduce erosion, is to create a velocity of about 5–20 feet/second in the apertures 82. This is about 5–40 times the maximum velocity in the annular areas 84, 84' formed between the outer member 24 and the base or inner pipe 22. This velocity will create enough of a restriction to disperse high flow areas of the well without creating erosion problems in the ring. For example, for a 4" diameter base pipe 22 flowing at an average of 200–400 bbl/day/ft of length of the screen, the total flow area of the openings in each ring 80, 80' should be from 0.2–0.4 in$^2$. This area could be obtained by 16–32 holes of a diameter of 0.125" in each flow control ring 80, 80'. In a particular embodiment, the outer diameter of the outer member 24 is 4.8 inches and its wall thickness is 0.125 inches. The outer diameter of the inner pipe 22 is 4.0 inches and its wall thickness is 0.375 inches. The width of the slots (not visible) between the wraps of wire 64 which form the surface of screen 60 is 0.006". We prefer that the total inlet flow area for the perforations 50 on the outer member 24 be between 400–800 in$^2$. The total inlet flow area for both the screen slots and the perforations 40 is preferably about 300 in$^2$.

While the invention has been particularly shown and described with reference to the preferred embodiments thereof, it will be understood by those skilled in the art that various alterations in form and detail may be made therein without departing from the spirit and scope of the invention. For example, while the structure attributed to screen 60 has been that of a single screen, it should be understood that other types of screens could likewise be protected by the present invention, including dual wire wrap and prepack screens.

The embodiments of the invention in which an exclusive property or privilege is claimed are defined as follows:

1. A casing assembly for a well, the casing assembly comprising:

an essentially cylindrical inner pipe extending along a casing axis for the entire length of the casing assembly, the inner pipe having a series of perforations formed through its surface along a first length segment of the casing axis;

an essentially cylindrical outer member radially spaced from and concentrically located about the inner pipe and also extending along the casing axis, the outer member having a series of perforations formed through its surface along a second length segment of the casing axis;

a screen mounted over an outer circumferential surface of the inner pipe and over the series of perforations formed on the inner pipe;

wherein the first length segment and the screen mounted over its surface and the second length segment along the casing axis are substantially offset with respect to one another.

2. The apparatus of claim 1, wherein the first length segment and the second length segment are substantially non-overlapping.

3. The apparatus of claim 1, further comprising at least one flow control member located in an annular space formed between the outer member and the inner pipe at one end of the screen, said at least one flow control member having apertures therein for allowing fluid to flow in a direction substantially parallel to the casing axis from the first length segment to the second length segment.

4. The apparatus of claim 1, wherein each end of the inner pipe has means thereon to permit the casing assembly to be attached to another casing assembly.

5. The apparatus of claim 1 wherein the series of perforations formed along a first length segment of the inner pipe are positioned in a middle portion of the length of the inner pipe and the series of perforations which are formed through the outer member along a second length segment of the casing axis are positioned at one end of the length of the outer member, said outer member further having an additional series of perforations along a third length segment which is positioned at a second end of the outer member.

6. The apparatus of claim 5, wherein the first length segment, the second length segment,and the third length segment are substantially non-overlapping.

7. The apparatus of claim 6 wherein the first length segment has an axial length substantially equal to the combined length of the of the second length segment and the third length segment.

8. The apparatus of claim 6, further comprising a pair of flow control members located in annular spaces formed between the outer member and the inner pipe at each end of the screen, said flow control members having apertures therein for allowing fluid to flow in a direction substantially parallel to the casing axis from the first length segment and the third length segment to the second length segment.

9. The apparatus of claim 1 where the screen is mounted at each of its ends over an outer circumferential surface of the inner pipe by a pair of attachment rings which have an outer portion which is larger in diameter than the outer surface of the screen, whereby fluid flow over said rings will be diverted from the surface of the screen.

10. The apparatus of claim 9 wherein each of said attachment rings has an annular recessed portion located under said outer portion which receives and retains one end portion of the screen.

11. The apparatus of claim 9 wherein said screen comprises plurality of longitudinally extending support wires over which a profiled wire is helically wrapped and welded at every intersection.

12. A casing assembly for a well, the casing assembly comprising:

an essentially cylindrical inner pipe extending along a casing axis for the entire length of the casing assembly;

an essentially cylindrical outer member concentrically located about the inner pipe and also extending along the casing axis;

wherein the inner pipe and the outer member respectively have inner pipe perforations and outer member perforations formed along the casing axis, and wherein the inner pipe perforations and outer member perforations are formed in alternating sequence along the casing axis;

a screen mounted over an outer circumferential surface of the inner pipe perforations.

13. The apparatus of claim 12, wherein the inner pipe perforations and outer member perforations are substantially non-overlapping along the casing axis.

14. The apparatus of claim 12, further comprising at least one flow control member located in an annular space formed between the outer member and the inner pipe at one end of the screen, said at least one flow control member having apertures therein for allowing fluid to flow in a direction substantially parallel to the casing axis from the first length segment to the second length segment.

* * * * *